No. 896,133. PATENTED AUG. 18, 1908.
G. MAYER.
STOVE LID AND POT LIFTER.
APPLICATION FILED APR. 9, 1906.

WITNESSES:
E. B. McBath
Rea P. Bright

INVENTOR
G. Mayer.
BY
O'Meara & Brock
ATTORNEYS

UNITED STATES PATENT OFFICE.

GEORGE MAYER, OF KIMBALL, MINNESOTA.

STOVE-LID AND POT LIFTER.

No. 896,133.      Specification of Letters Patent.      Patented Aug. 18, 1908.

Application filed April 9, 1906. Serial No. 310,710.

*To all whom it may concern:*

Be it known that I, GEORGE MAYER, a citizen of the United States, residing at Kimball, in the county of Stearns and State of Minnesota, have invented a new and useful Improvement in Stove-Lid and Pot Lifters, of which the following is a specification.

This invention relates to stove lid and pot lifters and has for its object to provide a lifter which is very simple and cheap in construction and one which is very effective in use.

Another object of my invention is to provide a lifter so constructed that it can be used for a stove door opener or for a pot lifter when desired.

Another object of my invention is to provide the foot of the lifter with a heel, adapted to engage the opening in the lid and make it impossible for the lid to drop off.

The invention consists in certain details of construction, hereinafter fully described and pointed out in the claims.

Figure 1:
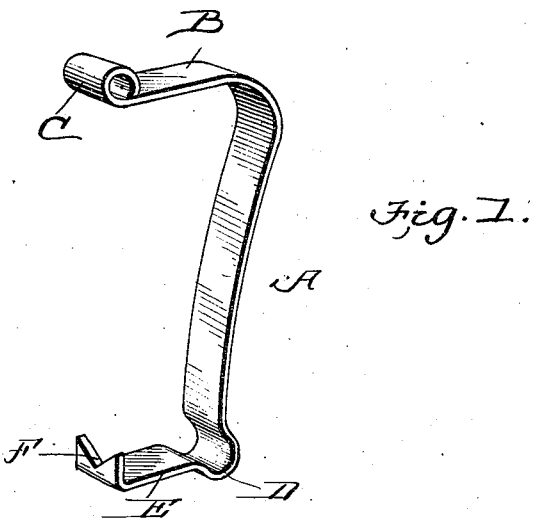
Figure 2:
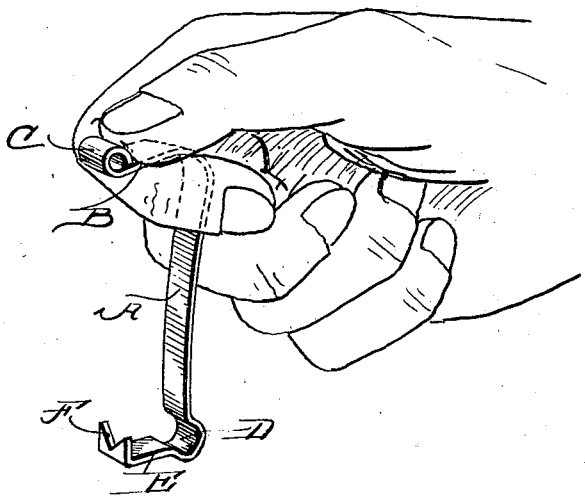
Figure 3:
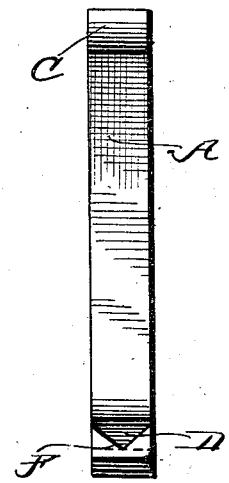

In the drawings forming a part of this specification:—Figure 1 is a perspective view of the stove lid and pot lifter. Fig. 2 is a perspective view of the stove lid and pot lifter showing the manner of holding the same when used as a stove lid lifter. Fig. 3 is an end view of the stove lid and pot lifter.

Referring to the drawing A, indicates a strip of metal preferably of spring steel having its upper end bent at a right angle to form a handle B, the extreme end being bent back upon itself to form a loop C, adapted to be engaged by the thumb when used for a stove lid lifter. The lower end is bent to form an opened loop D, forming a heel for the right angle foot E, which is provided with a forked or pronged upwardly projecting toe member F the foot and handle being parallel with each other. The foot is adapted to be inserted into the recess in the lid and be securely locked therein by the heel when held in a vertical position. It will readily be seen that the open loop forming the heel, can be used as a pot lifter when desired, and the forked toe used to open the stove door when the handle is too hot to be caught hold of with the hand.

From the foregoing description it will be seen that I have provided a stove lid and pot lifter so constructed that all danger of the lid slipping off is prevented.

Having thus fully described my invention, what I claim as new and desire to secure by Letters Patent is:—

1. A stove lid and pot lifter comprising a body portion having a handle portion provided with a looped end, an opened loop portion forming a heel and a foot portion connected to said heel arranged under said handle portion and parallel therewith, for the purpose described.

2. A stove lid and pot lifter comprising a body portion provided with a right-angled handle portion provided with a looped end, an opened loop portion forming a heel and a right-angle foot portion connected to said heel portion, said handle and foot being parallel with each other, for the purpose described.

GEORGE MAYER.

Witnesses:
    DOROTHEA WIEBER,
    E. WIEBER.